US008600301B2

(12) United States Patent
Kim

(10) Patent No.: US 8,600,301 B2
(45) Date of Patent: Dec. 3, 2013

(54) PORTABLE TERMINAL HAVING BLUETOOTH MODULE AND BLUETOOTH COMMUNICATION METHOD THEREOF

(75) Inventor: Sang Don Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 633 days.

(21) Appl. No.: 12/238,909

(22) Filed: Sep. 26, 2008

(65) Prior Publication Data

US 2009/0088078 A1  Apr. 2, 2009

(30) Foreign Application Priority Data

Sep. 27, 2007  (KR) ........................ 10-2007-0097223

(51) Int. Cl.
*H04B 7/00* (2006.01)

(52) U.S. Cl.
USPC ..... 455/41.2; 455/550.1; 455/41.1; 455/41.3; 455/556.1; 455/569.1; 455/423; 455/559.2

(58) Field of Classification Search
USPC ........ 455/41.2, 550.1, 456.1, 73, 74.1, 575.2, 455/91, 41.1, 41.3, 556.1, 569.1, 423, 569.2
See application file for complete search history.

(56) References Cited

U.S. PATENT DOCUMENTS

| | | | | |
|---|---|---|---|---|
| 6,216,017 | B1 * | 4/2001 | Lee et al. | 455/567 |
| 7,218,957 | B2 * | 5/2007 | Katayama | 455/569.1 |
| 7,620,433 | B2 * | 11/2009 | Bodley | 455/575.2 |
| 7,844,220 | B2 * | 11/2010 | Wang | 455/39 |
| 2004/0198464 | A1 * | 10/2004 | Panian | 455/569.1 |
| 2006/0121960 | A1 * | 6/2006 | Wang | 455/575.2 |
| 2006/0251277 | A1 * | 11/2006 | Cho | 381/311 |
| 2007/0054704 | A1 * | 3/2007 | Satoh | 455/569.1 |
| 2007/0225018 | A1 * | 9/2007 | Cho | 455/456.1 |
| 2008/0090524 | A1 * | 4/2008 | Lee et al. | 455/41.2 |
| 2009/0011799 | A1 * | 1/2009 | Douthitt et al. | 455/569.1 |
| 2009/0088078 | A1 * | 4/2009 | Kim | 455/41.2 |
| 2009/0111529 | A1 * | 4/2009 | Miyake | 455/569.2 |
| 2009/0111530 | A1 * | 4/2009 | Nakayama et al. | 455/569.2 |
| 2010/0062714 | A1 * | 3/2010 | Ozaki | 455/41.3 |
| 2010/0197362 | A1 * | 8/2010 | Saitoh et al. | 455/569.2 |
| 2011/0081859 | A1 * | 4/2011 | Chung | 455/41.2 |
| 2011/0136547 | A1 * | 6/2011 | Espersen et al. | 455/569.1 |
| 2011/0143666 | A1 * | 6/2011 | Lee | 455/41.2 |

FOREIGN PATENT DOCUMENTS

KR   1020030032457   *   4/2003

* cited by examiner

*Primary Examiner* — Temesgh Ghebretinsae
*Assistant Examiner* — Md Talukder
(74) *Attorney, Agent, or Firm* — Jefferson IP Law, LLP

(57) ABSTRACT

A portable terminal having a Bluetooth module and a Bluetooth communication method between the portable terminal and a device having a Bluetooth module are provided. The method includes determining whether the portable terminal receives a signal from the device in a call history viewing mode, during Bluetooth communication between the portable terminal and the device, wherein the signal is generated as a volume control key of the device is operated. The method also includes scrolling and displaying the call history, in the portable terminal, according to the received signal. The call history can be searched for in the portable terminal by using a volume control key of a headset or a hands-free accessory, which is linked to the portable terminal via Bluetooth communication, thereby providing users with a convenient mode of operation.

8 Claims, 4 Drawing Sheets

PORTABLE TERMINAL HAVING BLUETOOTH MODULE AND BLUETOOTH COMMUNICATION METHOD THEREOF

PRIORITY

This application claims priority under 35 U.S.C. §119(a) of a Korean patent application filed in the Korean Intellectual Property Office on Sep. 27, 2007 and assigned Serial No. 2007-0097223, the entire disclosure of which is hereby incorporated by reference.

BACKGROUND OF THE INVENTION

1. Field of the Invention

The present invention relates to Bluetooth communication. More particularly, this present invention relates to a portable terminal having a Bluetooth module and method for searching for a call history stored in the portable terminal using a headset or a hands-free volume control key.

2. Description of the Related Art

Recently, due to developments on technology using wireless devices or wireless links which is relatively low cost and consumes a low level of electrical power in wireless communication, a variety of wireless-related techniques have been developed and realized. One example is Bluetooth. Bluetooth is a wireless protocol based on a short-range radio communication technology. Bluetooth provides a method for exchanging audio signals and data between devices, within a radius of about 10 m, at a maximum data rate of 1 Mbps, over an Industrial Scientific and Medical (ISM) 2.4 GHz short-range radio frequency bandwidth. Bluetooth modules consume a relatively low level of electrical power and thus have become popular in various fields.

For example, a portable terminal equipped with a Bluetooth module allows a user to call another party without using the user's hand. To this end, the portable terminal has various types of devices, such as a wireless headset, hands-free accessories, etc. A user can call the other party using the headset or the hands-free accessories, in particular, by using a call history. However, although the headset or the hands-free accessories do not require a user to hold a portable terminal in the user's hand when the user makes a call, if the user checks a call history, the user must hold the portable terminal in the user's hand to see the history on the screen. This may cause an inconvenience to the user.

Therefore, a need exists for an improved portable terminal and method for retrieving a call history stored in the portable terminal and for making a call using a headset or a hands-free accessory.

SUMMARY OF THE INVENTION

An aspect of the present invention is to address the above-mentioned problems and/or disadvantages and to provide at least the advantages described below. Accordingly, an aspect of the present invention is to provide a portable terminal having a Bluetooth module that can search for a call history, during Bluetooth communication, using a volume control key of a headset or a hands-free accessory, and a Bluetooth communication method using the same.

Another aspect of the present invention is to provide a portable terminal equipped with a Bluetooth module that can search for a call history stored in the portable terminal during the Bluetooth communication using a volume control key of a headset or a hands-free accessory, and can provide the call history in a voice, and a Bluetooth communication method using the portable terminal.

In accordance with an aspect of the present invention, a Bluetooth communication method between a portable terminal and a Bluetooth device is provided. The method includes determining whether the portable terminal receives a signal from the Bluetooth device in a call history viewing mode, during Bluetooth communication between the portable terminal and the Bluetooth device, wherein the signal is generated as a volume control key of the Bluetooth device is operated, and scrolling and displaying the call history, in the portable terminal, according to the received signal.

In accordance with another aspect of the present invention, a portable terminal is provided. The portable terminal includes a first Bluetooth module for communicating with a second Bluetooth module installed in a Bluetooth device via Bluetooth communication, and a controller for scrolling and displaying a call history, according to a signal that corresponds to the operation of a volume control key of the Bluetooth device, in a call history viewing mode, during the Bluetooth communication between the portable terminal and the Bluetooth device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Prior to explaining exemplary embodiments of the present invention, terminologies will be defined in the following description.

The term "sound volume variation value" refers to a value that is transmitted to a portable terminal from a headset or a hands-free accessory, which is linked to the portable terminal via Bluetooth communication, when a volume control key is operated. Furthermore, the "sound volume variation value" refers to a command, expressed "AT+VTS= . . . " in a Bluetooth protocol specification.

The term "sound volume compensation value" refers to a value that is transmitted from a portable terminal, in which the value compensates the sound volume of the headset or the hands-free accessory, which can be altered according to a sound volume variation value transmitted from the headset or the hands-free accessory. Furthermore, the "sound volume compensation value" refers to a command, expressed "+VGS: . . . " in a Bluetooth protocol specification. That is, although the volume control key is operated in the headset or the hands-free accessory, the actual sound volume is not altered by the sound volume compensation value transmitted from the portable terminal.

Although the present invention is described based on a portable terminal as an example, it should be understood that the present invention is not limited by the portable terminal. That is, the portable terminal in exemplary embodiments of the present invention may be a terminal that is equipped with a Bluetooth communication module and thus can provide a user with a convenience mode of operation. For example, the terminal can be applied to any information communication devices, multimedia devices, and their applications, such as, mobile phones, wired/wireless phones, portable multimedia players, personal digital assistant (PDA) terminals, smart phones, MP3 players, and the like.

Figure 1:
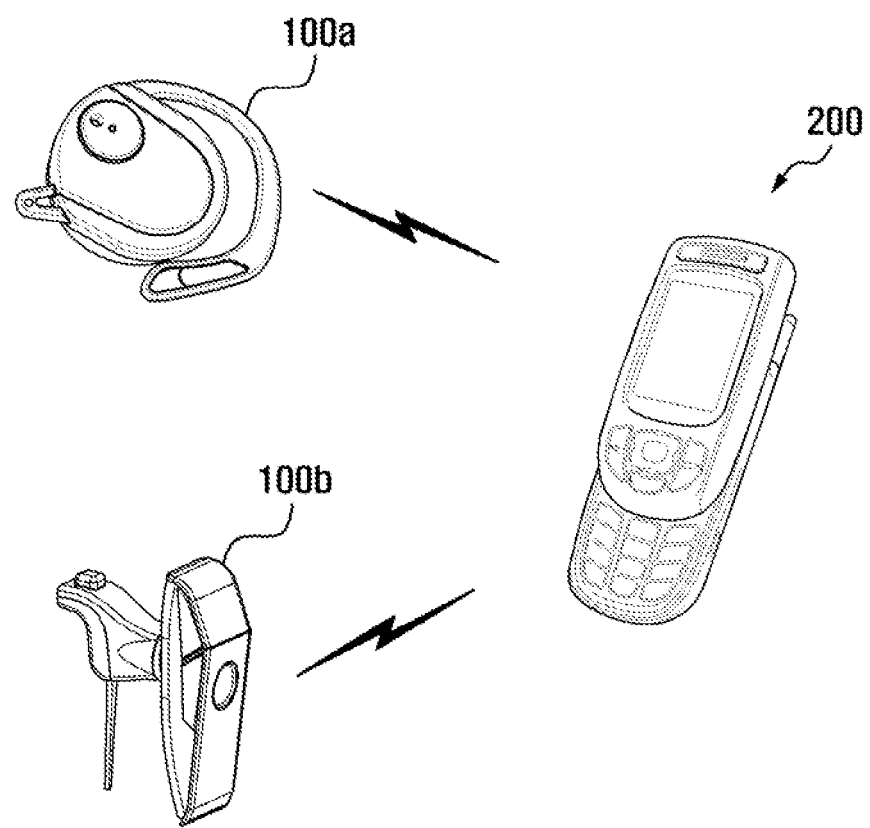
FIG. 1 illustrates Bluetooth communication between a portable terminal having a Bluetooth module and a Bluetooth device according to an exemplary embodiment of the present invention.

FIG. 1 illustrates Bluetooth communication between a portable terminal having a Bluetooth module and a Bluetooth device according to an exemplary embodiment of the present invention.

A portable terminal 200 may be connected to a Bluetooth device equipped with a Bluetooth module. For example, the device may be a headset 100a or a hands-free accessory 100b. The device is hereinafter labeled by reference number 100a or 100b. The device may perform communication using protocols such as Bluetooth, IrDA, Zigbee, and the like. The Blue device also may employ a variety of wireless communication modules that establish short-range communication channels.

Bluetooth provides a method of communication between Bluetooth devices over an Industrial Scientific and Medical (ISM) 2.4 GHz short-range radio frequency bandwidth. An advantage of the ISM radio bands is that they may be used by designers for equipment without obtaining any license. Bluetooth has a lower guard band of 2 MHz below the ISM band and an upper guard band of 3.5 MHz above the IMS band to prevent other Bluetooth devices from interfering. Bluetooth uses frequency hopping at 1,600 hops per second.

Figure 2:
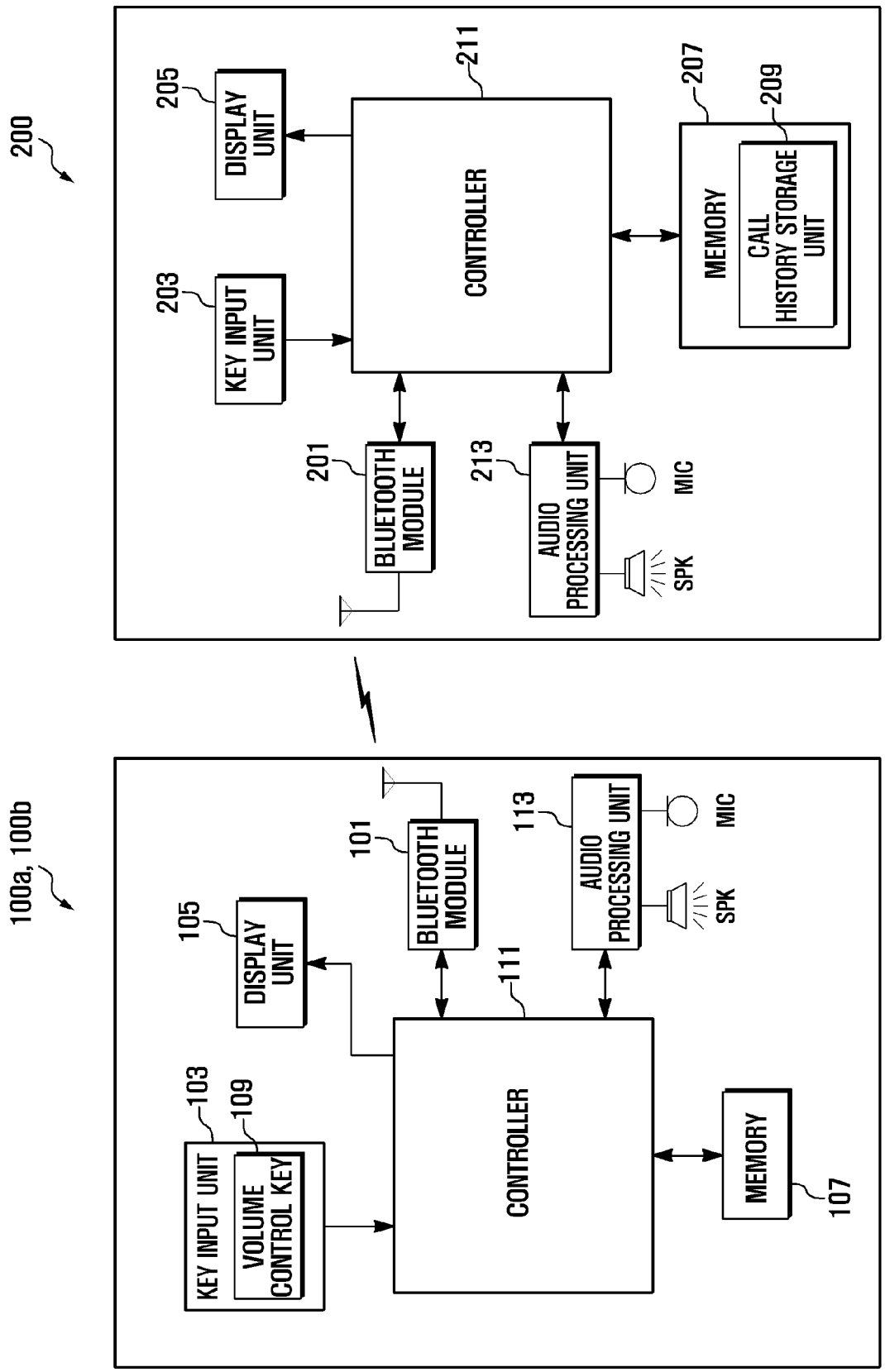
FIG. 2 is a schematic block diagram illustrating a portable terminal and a Bluetooth device, between which Bluetooth communication is performed, according to an exemplary embodiment of the present invention.

While the device 100a or 100b is linked with a portable terminal via Bluetooth communication, a volume control key 109, as shown in FIG. 2, may be moved up and down in a mode for viewing a call history of the portable terminal 200. The up and down movement of the volume control key 109 may be used to control the viewing of the call history. For example, the up and down movement may control scrolling of the call history up and down.

The portable terminal 200 can provide a voice call service, a Short Message Service (SMS), a Multimedia Message Service (MMS), and the like using a mobile communication system. The portable terminal 200 may include a camera. Also, the portable terminal 200 may include an MP3 player function.

Similar to the device 100a or 100b, the portable terminal 200 includes a Bluetooth module. The portable terminal 200 can perform communication using protocols such as Bluetooth, IrDA, Zigbee, and the like. The terminal 200 also can employ a variety of wireless communication modules that establish short-range communication channels through which signals are transmitted and received.

During Bluetooth communication between the portable terminal 200 and the device 100a or 100b, when the portable terminal 200 receives a signal, generated as a volume control key is moved up and down, in a mode for viewing a call history thereof, it scrolls the call history up and down on a display unit. The portable terminal 200 may transmit a highlighted call history to the device 100a or 100b, so that the device can output a highlighted call number with a voice.

FIG. 2 is a schematic block diagram illustrating a portable terminal and a device between which Bluetooth communication is performed, according to an exemplary embodiment of the present invention.

As shown in FIG. 2, the portable terminal 200 includes a Bluetooth module 201, a key input unit 203, a display unit 205, a memory 207, a controller 211, and an audio processing unit 213.

The Bluetooth module 201 performs a series of operations for transmitting and receiving control signals and audio signals to and from the device 100a or 100b that can perform the Bluetooth communication, for example a headset and a hands-free accessory, through its wireless interface. In particular, the Bluetooth module 201 receives control signals from the device 100a or 100b and outputs them to the controller 211. The Bluetooth module 201 may further include a function for analyzing the received control signals.

The key input unit 203 receives user's commands for controlling operations of the portable terminal 200. The key input unit 203 may set a Bluetooth mode and a voice output mode, to request a call history viewing mode, to receive a call key input, etc.

The display unit 205 displays a variety of information about states and operations of the portable terminal 200. More particularly, the display unit 205 displays a call history. The display unit 205 may display a highlighted first list in a call history mode and then move the highlighted portion according to a received signal that is related to the operation of the volume control key 109 of the device 100a or 100b.

The display unit 205 may be provided as a Liquid Crystal Display (LCD). In this case, the display unit 205 may include a controller for controlling the LCD, a video memory in which image data is stored and an LCD element. If the LCD is provided as a touch screen, the display unit 205 may perform a part or all of the functions of the key input unit 203.

The memory 207 may store information and programs necessary for operating the portable terminal 200. In particular, the memory 207 includes a call history storage unit 209 for storing information about calls of the portable terminal 200. Here, the calls include incoming calls, outgoing calls, missed calls and the like. The call history storage unit 209 can store phone numbers of connected other user's phones, subscriber information, call time, and the like.

The controller 211 controls the operation of the portable terminal 200. More particularly, the controller 211 controls the Bluetooth communication between the portable terminal 200 and the device 100a or 100b. During the Bluetooth communication, when the controller 211 receives a signal, which corresponds to the operation of the volume control key 109, from the device 100a or 100b in a call history viewing mode, it outputs the call history to the display unit. That is, the controller 211 may scroll and display the call history on the display unit 205, by moving a highlighted portion up and down, according to the signal that is generated as the volume control key 109 is moved up and down and transmitted from the device 100a or 100b to the portable terminal 200. The controller 211 outputs the call history according to a sound volume variation value transmitted from the device 100a or 100b. This result is similar to the effect where the history is scrolled up and down using a navigation control key of a portable terminal 200 in a call history viewing mode.

When a voice output mode is set in the portable terminal 200, the controller 211 may transmit an audio signal corresponding to a highlighted call history to the device 100a or 100b, so that the device 100a or 100b can output the highlighted call history with a voice.

The audio processing unit 213 reproduces a voice based on an audio signal output from the controller 211 or transmits audio signals input from a microphone to an audio codec of the controller 211.

Referring to FIG. 2, the device 100a or 100b each include a Bluetooth module 101, a key input unit 103, a display unit 105, a memory 107, a controller 111 and an audio processing unit 113.

The Bluetooth module 101 performs a series of operations for transmitting and receiving control signals and audio signals to and from a portable terminal 200 via a wireless interface. More particularly, the Bluetooth module 101 receives control signals from the portable terminal 200 and outputs them to the controller 111. The Bluetooth module 101 may further include a function for analyzing the received control signals.

The key input unit 103 receives user's signals for controlling operations of the device 100a or 100b. The key input unit 103 includes a volume control key 109. The volume control key 109 serves to control a local volume of the device 100a or 100b, in which examples of the device are a headset 100a and a hands-free accessory 100b. The volume control key 109 may be controlled by its up or down key operation to scroll a call history up and down in a call history viewing mode while the device 100a or 100b are connected with the portable terminal 200 via the Bluetooth communication. The display unit 105 displays a variety of information about the states and operations of the device 100a or 100b.

The memory 107 stores information and programs necessary for the operation of the device 100a or 100b.

The controller 111 controls the operation of the device 100a or 100b. The controller 111 controls the Bluetooth communication between the portable terminal 200 and the device 100a or 100b. During the Bluetooth communication, when the volume control key 109 is operated in a call history viewing mode, the controller 111 transmits a signal corresponding to the key operation to portable terminal 200. That is, the controller 111 transmits a signal, such as a command "AT+VTS= . . . ," which corresponds to an up or down operation of the volume control key 109, to the portable terminal 200 through the Bluetooth module 101. The command "AT+VTS= . . . " is a sound volume variation value that is transmitted to the portable terminal 200 in the Bluetooth communication, when the local volume of the device 100a or 100b is operated, i.e., the volume control key 109 of the device 100a or 100b is operated. The command "AT+VTS= . . . " is defined in the Bluetooth specification and its detailed description will be omitted for clarity and conciseness. The portable terminal 200 according to an exemplary embodiment of the present invention is not designed to control the local volume of the device 100a or 100b according to the commands transmitted from the device 100a or 100b, but to control the call history, for example to scroll the call history up and down.

When the portable terminal 200 is set to a voice output mode and a call history is scrolled up or down, the controller 111 may output the highlighted call history, transmitted from the portable terminal 200, through a speaker.

The audio processing unit 113 outputs a voice based on an audio signal received from the controller 111 or transmits audio signals input from a microphone to an audio codec (not shown) of the controller 111.

Figure 3:
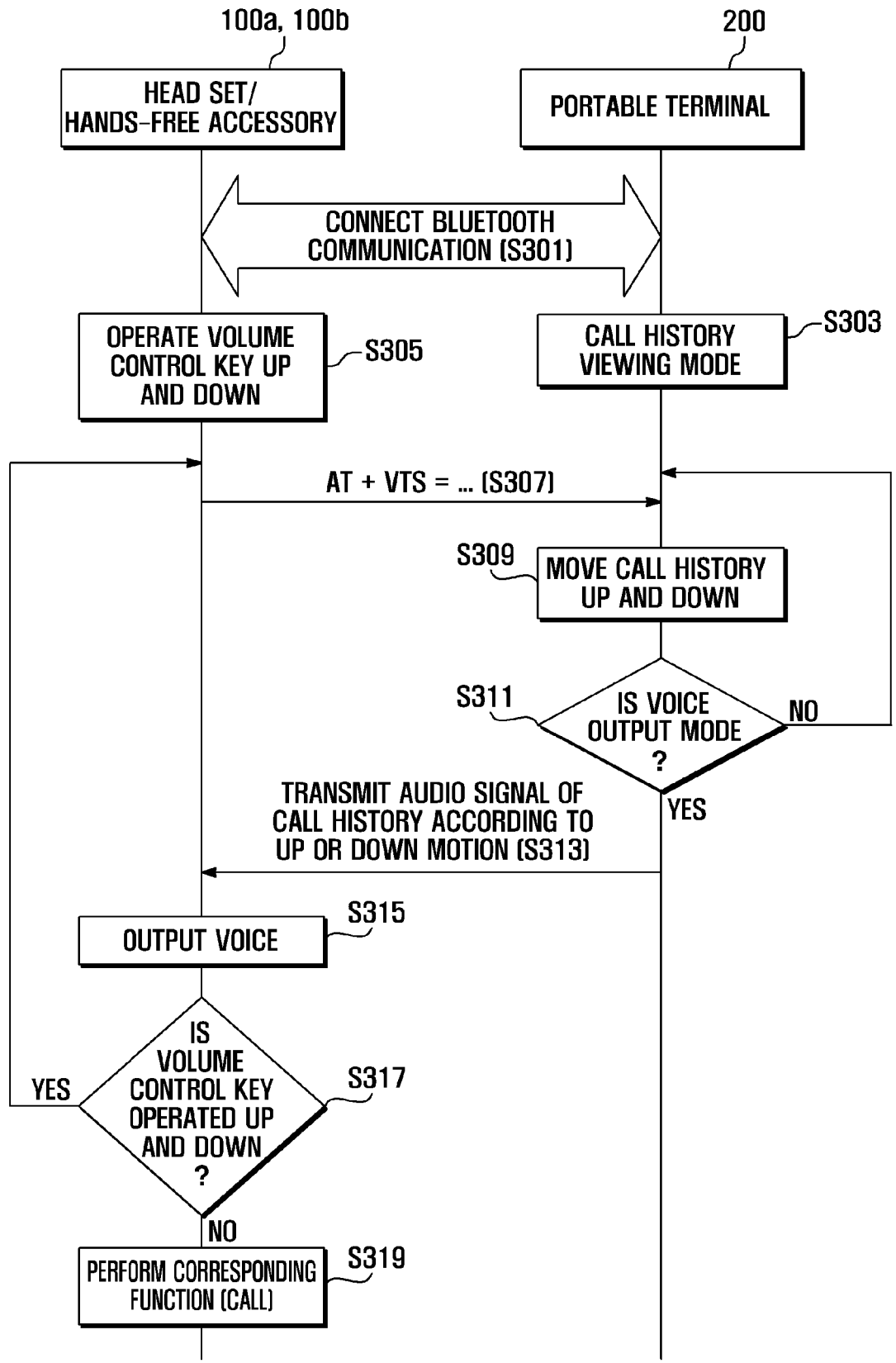
FIG. 3 is a flowchart describing a Bluetooth communication method between a portable terminal and a Bluetooth device according to an exemplary embodiment of the present invention.

FIG. 3 is a flowchart describing a Bluetooth communication method between a portable terminal and a device according to an exemplary embodiment of the present invention.

Referring to FIG. 1 to FIG. 3, the device 100a or 100b is connected to the portable terminal 200 via Bluetooth communication in step S301. Such a connection is established by a general process for the Bluetooth communication. That is, a Bluetooth module 201 is driven to search for devices that can perform the Bluetooth communication in the portable terminal 200 and then select a device 100a or 100b, thereby establishing such a connection between the portable terminal 200 and the device 100a or 100b.

The portable terminal 200 recognizes a call history viewing mode in step S303. A user can operate the key input unit 203 to view the call history stored in the memory 207 of the portable terminal 200. The call history viewing mode may be performed when one of the menus provided by the portable terminal 200 is selected or a hot key is input.

The device 100a or 100b recognizes that its volume control key 109 is operated up or down in a call history viewing mode in step S305. For example, a user can operate the volume control key 109 of the device 100a or 100b during the Bluetooth communication between the portable terminal 200 and the device 100a or 100b (for example, a headset or a hands-free accessory). That is, the volume control key 109 can be operated up or down. It should be understood that the operation of the volume control key 109 may be performed when the call history is displayed on the display unit 205 through the step S303.

The device 100a or 100b transmits a sound volume variation value to the portable terminal 200 in step S307. The sound volume variation value is generated as the volume control key 109 is operated up or down. For example, when the default sound volume variation value is five (5) at step S301 and the volume control key 109 is operated up once at step S305, the device 100a or 100b transmits a command "AT+VTS=6" to the portable terminal 200.

The portable terminal 200 scrolls the call history up and down according to the received sound volume variation value in step S309. When the portable terminal 200 receives a sound volume value, whose magnitude increases one level once, from the device 100a or 100b, it moves the highlighted portion up on the displayed call history.

The portable terminal 200 determines whether a voice output mode is set in step S311. When a voice output mode is set at S311, the portable terminal 200 transmits an audio signal corresponding to the highlighted call history to the device 100a or 100b in step S313. The portable terminal 200 transmits an audio signal corresponding to the highlighted call history, which is scrolled up once, to the device 100a or 100b, as described at step S309.

The device 100a or 100b outputs a voice corresponding to the received audio signal to a speaker in step S315, and determines whether the volume control key 109 is operated in step S317. If the volume control key 109 is operated at step S317, the procedure returns to step S307. That is, as the volume control key 109 of the device 100a or 100b is operated up and down, a call history can be scrolled up and down on the display unit 205 of the portable terminal 200, so that a user can search for a corresponding call history.

In contrast, if the volume control key 109 is not operated at step S317, it performs a corresponding function that is requested by the user in step S319. For example, when a user searches for call histories stored in the portable terminal 200, places the highlighted portion onto one of the call histories, and operates a call key of the portable terminal 200 or the device 100a or 100b, a call is connected to the corresponding phone number of the highlighted call history and thus the user can call the desired party.

Figure 4:
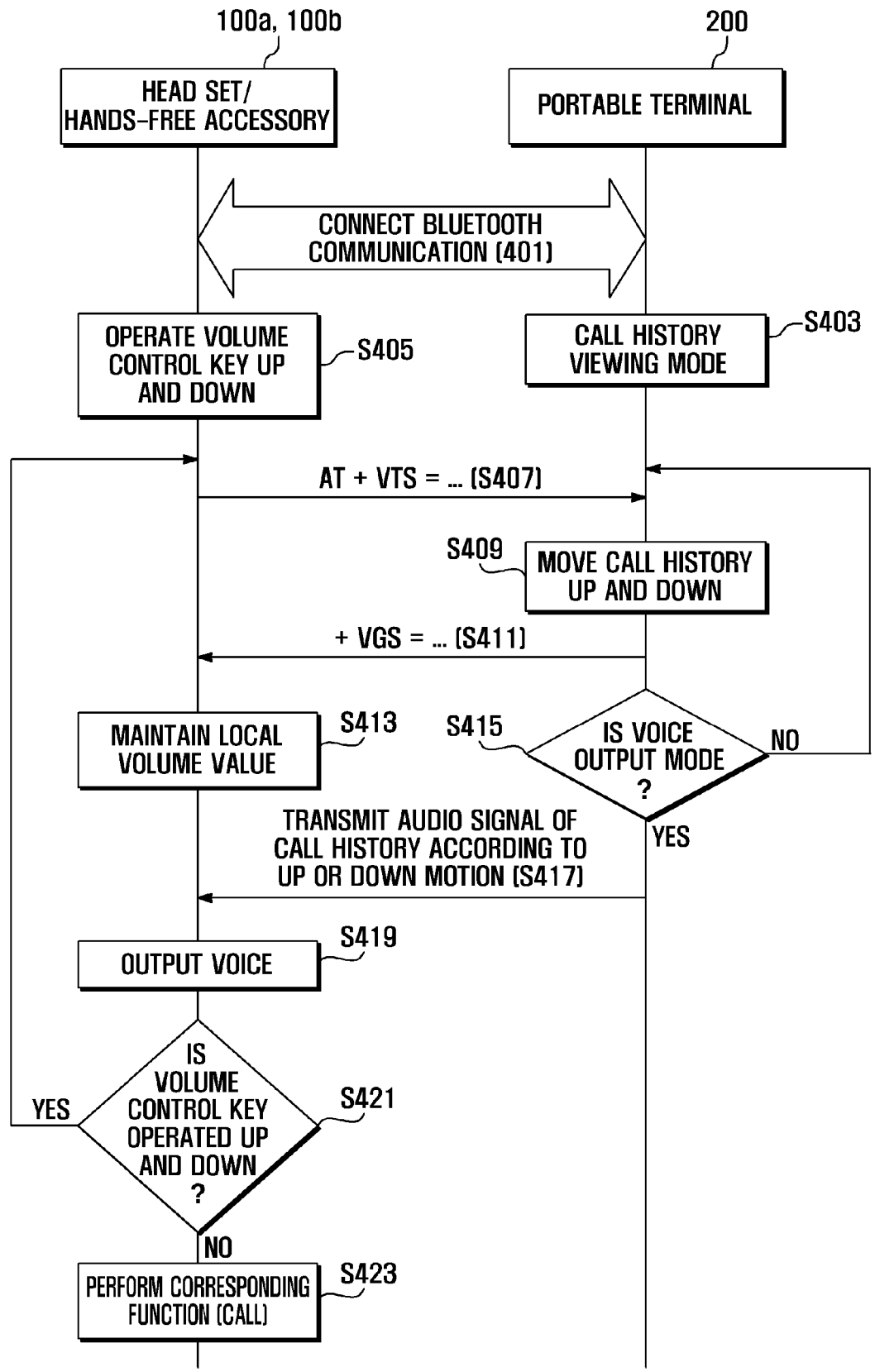
FIG. 4 is a flowchart describing a Bluetooth communication method between a portable terminal and a Bluetooth device according to an exemplary embodiment of the present invention.

FIG. 4 is a flowchart describing a Bluetooth communication method between a portable terminal and a device according to an exemplary embodiment of the present invention.

The exemplary embodiment is similar to the previous exemplary embodiment except that the local volume of the device is altered when the volume control key is operated up and down. The elements of the current exemplary embodiment, similar to those of the previous exemplary embodiment, will not be described below.

Referring to FIG. 1, FIG. 2 and FIG. 4, when the controller 211 receives a sound volume variation value from the device 100a or 100b during Bluetooth communication between the portable terminal 200 and the device 100a or 100b, it transmits a sound volume compensation value to the device 100a or 100b. The sound volume variation value is generated as the volume control key 109 is operated. The controller 211 scrolls a call history up and down according to the sound volume variation value, i.e., "AT+VTS= . . . " transmitted from the device 100a or 100b, as described in the previous embodiment, and, at the same time, transmits a command of a sound volume compensation value, i.e., "+VGS: . . . " to the device 100a or 100b, so that the local volume of the device 100a or 100b cannot be changed, or maintained. "+VGS: . . . " is a command defined in the Bluetooth specification and its detailed description will be omitted in this application.

The controller 111 of the device 100a or 100b receives a sound volume compensation value from the portable terminal 200 and maintains the local volume value.

Referring to FIG. 4, when the portable terminal 200 is connected with the device 100a or 100b via Bluetooth communication in step S401, it recognizes a call history viewing mode in step S403.

The device 100a or 100b recognizes that its volume control key 109 is operated up and down in a call history viewing mode in step S405. It transmits a sound volume variation value to the portable terminal 200 in step S407, in which the sound volume variation value is generated as the volume control key 109 is operated up or down. As an example, when the default sound volume variation value is five (5) at step S401 and the volume control key 109 is operated down once at step S405, the device 100a or 100b transmits a command "AT+VTS=4" to the portable terminal 200.

The portable terminal 200 scrolls the call history up and down according to the received sound volume variation value in step S409. When the portable terminal 200 receives a sound volume value, whose magnitude decreases one level once, from the device 100a or 100b, it moves the highlighted portion down on the displayed call history.

The portable terminal 200 transmits a sound volume compensation value, which corresponds to the sound volume variation value received at step S407, to the device 100a or 100b in step S411. More specifically, when the portable terminal 200 receives a command "AT+VTS=4" from the device 100a or 100b at step S407, it transmits "+VGS=4" to the device 100a or 100b.

The device 100a or 100b maintains its local volume value according to the received sound volume compensation value in step S413. If the volume control key 109 is operated down once at step S405, it receives a sound volume compensation value, which corresponds to the operation of the volume control key, from the portable terminal 200 at step S411 and thus maintains the local volume value.

The portable terminal 200 determines whether a voice output mode is set in step S415. When a voice output mode is set at step S415, the portable terminal 200 transmits an audio signal corresponding to the highlighted call history to the device 100a or 100b in step S417. The portable terminal 200 transmits an audio signal corresponding to the highlighted call history, which is scrolled down once, to the device 100a or 100b, as described at step S409.

The device 100a or 100b outputs a voice corresponding to the received audio signal to a speaker in step S419, and determines whether the volume control key 109 is operated in step S421. If the volume control key 109 is operated at step S421, the procedure returns to step S407. That is, as the volume control key 109 of the device 100a or 100b is operated up and down, a call history can be scrolled up and down on the display unit 205 of the portable terminal 200, so that a user can search for a corresponding call history.

In contrast, if the volume control key 109 is not operated at step S421, a corresponding function that is requested by the user is performed in step S423. For example, when the user searches for a call history stored in the portable terminal 200, the user may place the highlighted portion onto an entry of the call history, and operate a call key of the portable terminal 200 or the device 100a or 100b. When a call key is operated, a call is connected to the corresponding phone number of the highlighted call history and thus the user can call the called party.

It should be understood that the exemplary embodiments of the portable terminal having a Bluetooth module and of the Bluetooth communication method thereof may be variously modified without departing from the scope of the present invention.

For example, the exemplary embodiments can be modified in such a manner that a call history viewing mode can be directly conducted as the device is handled. That is, this modification does not require a user to hold and operate a portable terminal but merely handle the device in order to enable the portable terminal to enter a corresponding mode.

Also, although the exemplary embodiments are implemented in such a manner to search for a call history, it should be understood that the present invention is not limited by these exemplary embodiments. For example, the exemplary embodiments can be modified to search for histories, which can be stored in a portable terminal, such as an outgoing call history, an incoming call history, a missed call history, a schedule, a memo, a message, and the like.

As described above, according to the portable terminal equipped with a Bluetooth module and the Bluetooth communication method thereof, the call history can be easily searched in the portable terminal using a volume control key of the headset or the hands-free accessory, which is linked to the portable terminal via the Bluetooth communication, so that users can conveniently use the portable terminal.

Also, according to the portable terminal equipped with a Bluetooth module and the Bluetooth communication method thereof, the searched call history can be provided in a voice mode. When a user operates a call key while the searched call history is being providing to a user in a voice mode, the portable terminal may be connected to a corresponding phone number.

Although the exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims and their equivalents.

What is claimed is:

1. A Bluetooth communication method between a portable terminal and a device, the method comprising:
    determining whether the portable terminal receives a signal from the device when the portable terminal is in a call history viewing mode, during Bluetooth communication between the portable terminal and the device; and
    scrolling the call history displayed on a display unit of the portable terminal according to the received signal from the device,
    wherein the signal is generated as a volume control key of the device is operated, and
    wherein the scrolling and displaying of the call history comprises:
        transmitting a signal, generated as the volume control key is operated up or down, from the device to the portable terminal;
        scrolling and displaying the call history up or down on the display unit of the portable terminal according to the received signal; and
        transmitting an audio signal of the displayed call history from the portable terminal to the device to output a voice corresponding to the transmitted audio signal through the device.

2. The method of claim 1, further comprising:
    transmitting a sound volume compensating value, corresponding to the received signal, from the portable terminal to the device; and
    maintaining a current volume of the device according to the received sound volume compensating value.

3. The method of claim 1 further comprising:
    determining whether a volume control key is operated; and
    if the volume control key is operated, scrolling up or down the call history according to the volume control key.

4. The method of claim 1, wherein the scrolling and displaying of the call history comprises calling a phone number corresponding to one of the highlighted displayed call histories when a call key is operated.

5. A portable terminal comprising:
    a first Bluetooth module for communicating with a second Bluetooth module installed in a device via Bluetooth communication; and
    a controller for scrolling a call history displayed on a display unit of the portable terminal when the portable terminal is in a call history viewing mode according to a signal received from the device and that corresponds to an up or down operation of a volume control key of the device during Bluetooth communication between the portable terminal and the device,
    wherein the controller scrolls and displays the call history up or down on the display unit of the portable terminal according to the signal that corresponds to the up or down operation of the volume control key of the device, and
    wherein the controller transmits an audio signal of the displayed call history from the portable terminal to the device to output a voice corresponding to the transmitted audio signal through the device.

6. The portable terminal of claim 5, wherein the controller transmits a sound volume compensating value, which corresponds to the received signal, to the device.

7. The portable terminal of claim 5, wherein the controller determines whether a volume control key is operated and, if the volume control key is operated, scrolls up or down the call history according to the volume control key.

8. The portable terminal of claim 5, wherein the controller calls a phone number corresponding to one of the highlighted displayed call histories when a call key is operated.

* * * * *